(12) United States Patent
Seki et al.

(10) Patent No.: US 6,983,268 B2
(45) Date of Patent: Jan. 3, 2006

(54) LOG ANALYZING METHOD, EXECUTION APPARATUS FOR THE SAME, AND RECORDING MEDIUM FOR RECORDING PROCESS PROGRAM THEREOF

(75) Inventors: Yumiko Seki, Toyonaka (JP); Shinkichi Ebata, Samukawa (JP)

(73) Assignee: Hitachi, Ltd., Tokyo (JP)

( * ) Notice: Subject to any disclaimer, the term of this patent is extended or adjusted under 35 U.S.C. 154(b) by 712 days.

(21) Appl. No.: 09/989,017

(22) Filed: Nov. 21, 2001

(65) Prior Publication Data

US 2005/0021701 A1    Jan. 27, 2005

(30) Foreign Application Priority Data

Jan. 12, 2001    (JP)    ............................. 2001-004463

(51) Int. Cl.
G06F 17/30    (2006.01)
G06F 12/00    (2006.01)
G06F 11/00    (2006.01)

(52) U.S. Cl. .............................. 707/1; 707/200; 707/9; 714/1; 714/2; 714/48; 714/49

(58) Field of Classification Search ................ 707/1–4, 707/100, 200; 714/1–2, 25, 48
See application file for complete search history.

(56) References Cited

U.S. PATENT DOCUMENTS 5,619,621 A * 4/1997 Puckett ........................ 706/47
2002/0091971 A1 * 7/2002 Sawada et al. ............... 714/46
2004/0019460 A1 * 1/2004 Okuno et al. ............... 702/187

FOREIGN PATENT DOCUMENTS

JP    2000-122901    4/2000

* cited by examiner

*Primary Examiner*—Alford W. Kindred
(74) *Attorney, Agent, or Firm*—Townsend and Townsend and Crew LLP

(57) ABSTRACT

Even when a user does not know a structure of a computer readable program, a technique capable of analyzing log information is provided. A log analyzing method for analyzing log information outputted when a program is executed by a computer is comprised of: a step for acquiring log information outputted when a program is executed to thereby read the acquired log information; a step for accepting a user designation condition indicative of log information which is extracted; a step for extracting information from the log information based upon the accepted user designation condition, and for judging as to whether or not each of operations while the program is executed can satisfy an initial condition thereof so as to analyze a cause of an error occurred while the program is executed; and a step for providing a result of the error cause analysis to a user.

5 Claims, 12 Drawing Sheets

FIG. 2

EXAMPLE OF LOG INFORMATION (103)

| | |
|---|---|
| 01 | ***** Initialize Information ***** |
| 02 | Log output file name: logout1.txt |
| 03 | Log level definition: 1,2,3,4,5,L: Log output definition: default |
| 04 | Application: start: time 00.00.00: CPU status 3% |
| 05 | ************ |
| 06 | Method-A: Log level=1,M,Log output=default |
| 07 | Method-A: start: time 00.00.00: end time 00.00.08: maximum CPU status 3% |
| 08 | Method-A: connect: start time 00.01.26: end time 00.03.05: maximum CPU status 51% |
| 09 | Method-A:create object: start time 02.45.22: end time 02.45.57: maximum CPU status 35% |
| 10 | Method-A: commit: start time 02.47.14: end time 02.47.17: maximum CPU status 60% |
| 11 | Method-A: disconnect: start time 08.00.04: end time 08.00.05: maximum CPU status 15% |
| 12 | Method-A: exit: start time 10.29.72: end time 10.29.73: maximum CPU status 5% |
| 13 | ************ |
| 14 | Method-C: Log level=1,Π, Log output=default |
| 15 | Method-C: start: start time 15.25.07: end time 15.25.08: maximum CPU status 3% |
| 16 | Method-C: get object: start time 15.32.10: end time 15.33.17: maximum CPU status 3% |
| 17 | Method-C: error: time 16.21.00: CPU status 85%: error code 2178 error information 2199.3875.245 "invalid operation" |
| 18 | Method-C: exit: time 18.11.17: CPU status 80%: error return value |
| 19 | ************ |
| 20 | Application: exit: time 18.36.25: CPU status 3%: error code 2178 in Method-C message "invalid operation" |

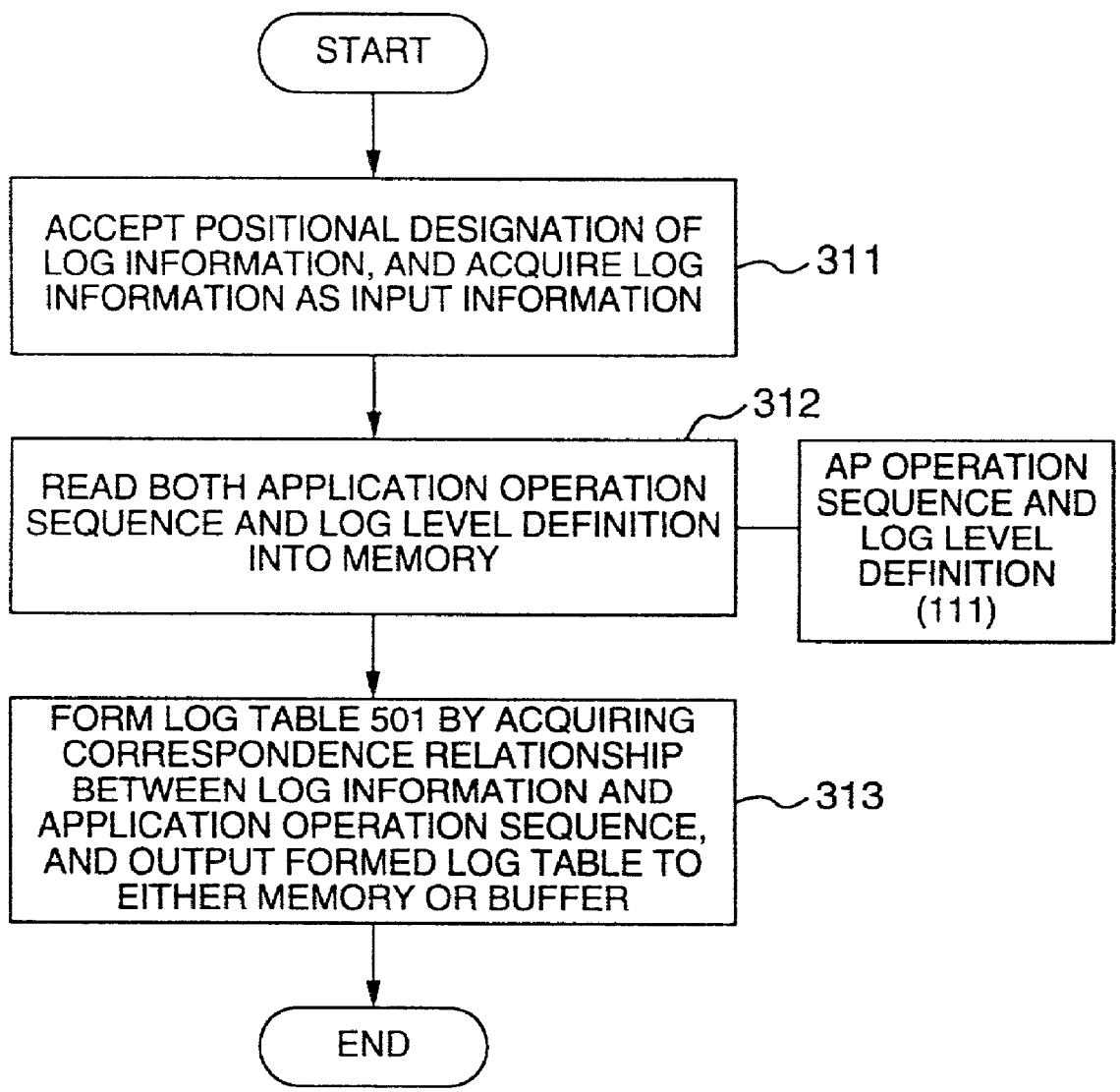

FIG. 4

EXAMPLE OF AP OPERATION SEQUENCE AND LOG LEVEL DEFINITION (111)

401

| LOG LEVEL DEFINITION (411) | OPERATION SEQUENCE (412) OF DOCUMENT PROCESS APPLICATION |
|---|---|
| 1 | ACCESS PROCESS OPERATION TO DOCUMENT DATABASE |
| 2 | UPDATE PROCESS OPERATION TO DOCUMENT DATABASE |
| 3 | NEWLY FORMING OF DOCUMENT DATA |
| 4 | ACCESS PROCESS OPERATION TO DOCUMENT DATA |
| 5 | DELETION OF DOCUMENT DATA |
| 6 | EXCLUSIVE PROCESS OPERATION OF DATA |
| 7 | EXCLUSIVE PROCESS OPERATION OF DATABASE |

402

| OPERATION SEQUENCE (412) OF DOCUMENT PROCESS APPLICATION | | OPERATION COMMAND (413) |
|---|---|---|
| ACCESS PROCESS OPERATION TO DOCUMENT DATABASE | CONNECT | CONNECT |
| | DISCONNECT | DISCONNECT |
| | QUERY | QUERY |
| UPDATE PROCESS OPERATION OF DOCUMENT DATABASE | COMMIT | COMMIT |
| | ROLLBACK | ROLLBACK |
| NEWLY FORMING PROCESS OF DOCUMENT DATA | | CREATE |
| ACCESS PROCESS OPERATION TO DOCUMENT DATA | ACQUIRE | GET |
| | EDIT | EDIT |
| | END | CLOSE, SUBMIT |
| | COPY | COPY |
| DELETION PROCESS OPERATION OF DOCUMENT DATA | | DELETE |
| EXCLUSIVE PROCESS OPERATION OF DATA | | LOCK |
| EXCLUSIVE PROCESS OPERATION OF DATABASE | | LOCKDB |

FIG. 5

LOG TABLE (501)

| | |
|---|---|
| START OF DOCUMENT PROCESS APPLICATION | APPLICATION INITIAL SETTING INFORMATION |
| START OF PROCESS OPERATION A | INITIAL SETTING INFORMATION OF PROCESS OPERATION A |
| PROCESS OPERATION A | ACCESS PROCESS OPERATION (CONNECT) TO DOCUMENT DATABASE |
| PROCESS OPERATION A | NEWLY FORMING OF DOCUMENT DATA |
| PROCESS OPERATION A | UPDATING OF DOCUMENT DATABASE |
| PROCESS OPERATION A | ACCESS PROCESS OPERATION (DISCONNECT) TO DOCUMENT DATABASE |
| END OF PROCESS OPERATION A | NORMAL END INFORMATION |
| START OF PROCESS OPERATION C | INITIAL SETTING INFORMATION OF PROCESS OPERATION C |
| PROCESS OPERATION C | ACCESS PROCESS OPERATION (ACQUIRE) TO DOCUMENT DATA |
| PROCESS OPERATION C | ERROR: ABNORMAL END CAUSED BY UNAUTHORIZED PROCESS OPERATION |
| END OF PROCESS OPERATION C | ABNORMAL END INFORMATION |
| END OF DOCUMENT PROCESS APPLICATION | ABNORMAL END INFORMATION |

FIG. 6

EXAMPLE OF USER DESIGNATION OF USER DESIGNATION CONDITION ACCEPTING PROCESS OPERATION (107)

601

| LOG INFORMATION TO BE EXTRACTED | | OPERATION SEQUENCE (412) OF DOCUMENT PROCESS APPLICATION |
|---|---|---|
| (YES) | NO | ACCESS PROCESS OPERATION TO DOCUMENT DATABASE |
| (YES) | NO | UPDATE PROCESS OPERATION TO DOCUMENT DATABASE |
| (YES) | NO | NEWLY FORMING OF DOCUMENT DATA |
| (YES) | NO | ACCESS PROCESS OPERATION TO DOCUMENT DATA |
| (YES) | NO | DELETION OF DOCUMENT DATA |
| YES | (NO) | EXCLUSIVE PROCESS OPERATION OF DATA |
| YES | (NO) | EXCLUSIVE PROCESS OPERATION OF DATABASE |

FIG. 8

EXAMPLE OF EXTRACTED RESULT BY LOG ANALYZING PROCESS (108)

~801

| PROCESS OPERATION A | ACCESS PROCESS OPERATION (CONNECT) TO DOCUMENT DATABASE |
|---|---|
| PROCESS OPERATION A | NEWLY FORMING OF DOCUMENT DATA |
| PROCESS OPERATION A | UPDATING OPERATION TO DOCUMENT DATABASE |
| PROCESS OPERATION A | ACCESS PROCESS OPERATION (DISCONNECT) TO DOCUMENT DATABASE |
| PROCESS OPERATION C | ACCESS PROCESS OPERATION (ACQUIRE) TO DOCUMENT DATA |
| PROCESS OPERATION C | ERROR: ABNORMAL END CAUSED BY UNAUTHORIZED PROCESS OPERATION |

FIG. 10

ANALYSIS RESULT PROVISION EXAMPLE BY LOG ANALYSIS RESULT PROVIDING PROCESS OPERATION (109)

APPLICATION EXECUTION RESULT:
DOCUMENT PROCESS APPLICATION IS ENDED UNDER ABNORMAL STATUS. THIS IS BECAUSE EVENT "ABNORMAL END" HAPPENS TO OCCUR IN AN XX-TH COLUMN OF PROCESS OPERATION C
(OPERATION IN PROCESS OPERATION C IS TO ACQUIRE DATA, AND COMMAND IS "get object")   ~1001

CAUSE:
CONNECTION TO DOCUMENT DATABASE IS DISCONNECTED IN PROCESS OPERATION A BEFORE DATA ACQUIRING OPERATION OF PROCESS OPERATION C   ~1002

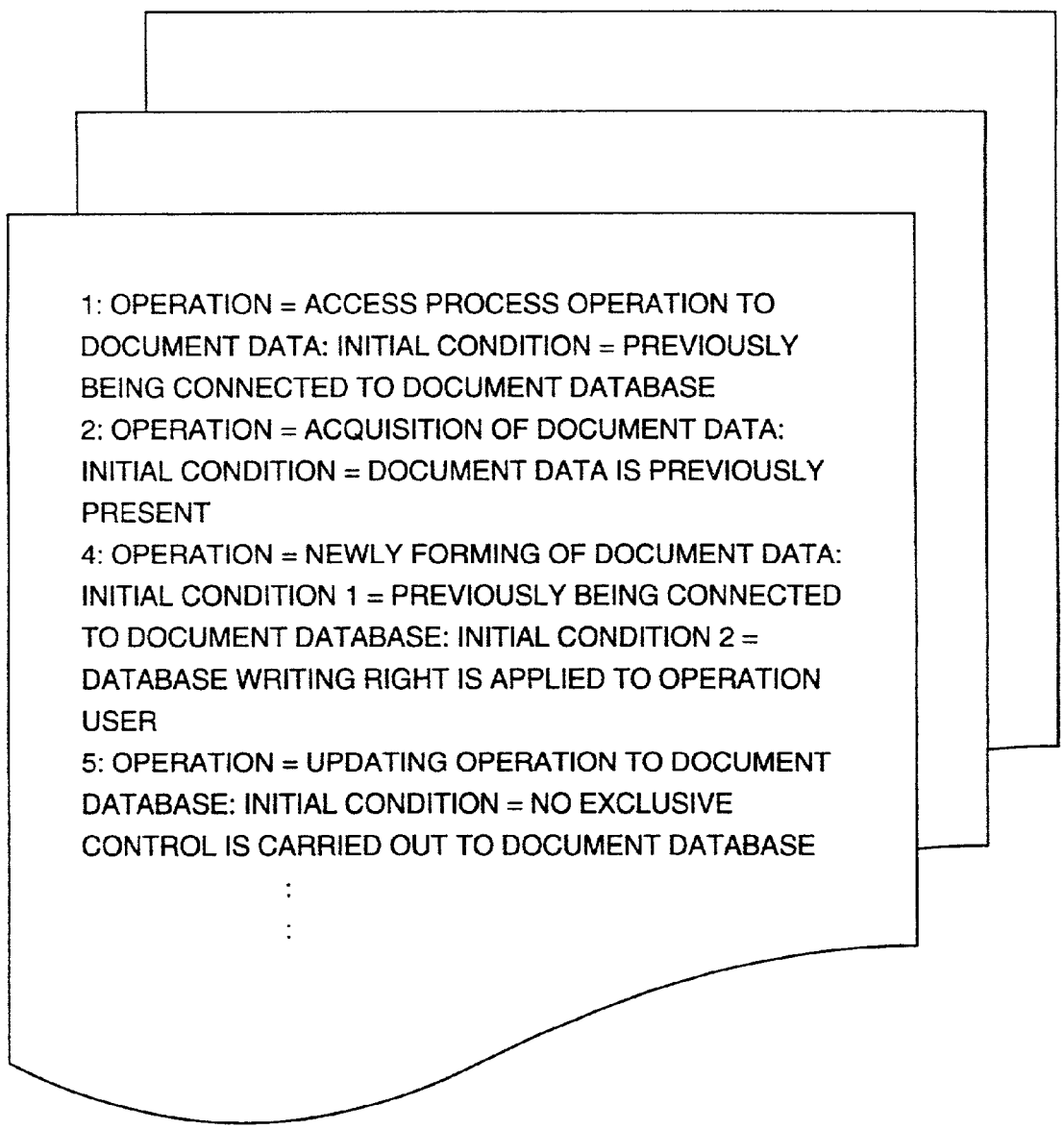

FIG. 9

EXAMPLE OF ANALYSIS RULE (112)

1: OPERATION = ACCESS PROCESS OPERATION TO DOCUMENT DATA: INITIAL CONDITION = PREVIOUSLY BEING CONNECTED TO DOCUMENT DATABASE
2: OPERATION = ACQUISITION OF DOCUMENT DATA: INITIAL CONDITION = DOCUMENT DATA IS PREVIOUSLY PRESENT
4: OPERATION = NEWLY FORMING OF DOCUMENT DATA: INITIAL CONDITION 1 = PREVIOUSLY BEING CONNECTED TO DOCUMENT DATABASE: INITIAL CONDITION 2 = DATABASE WRITING RIGHT IS APPLIED TO OPERATION USER
5: OPERATION = UPDATING OPERATION TO DOCUMENT DATABASE: INITIAL CONDITION = NO EXCLUSIVE CONTROL IS CARRIED OUT TO DOCUMENT DATABASE

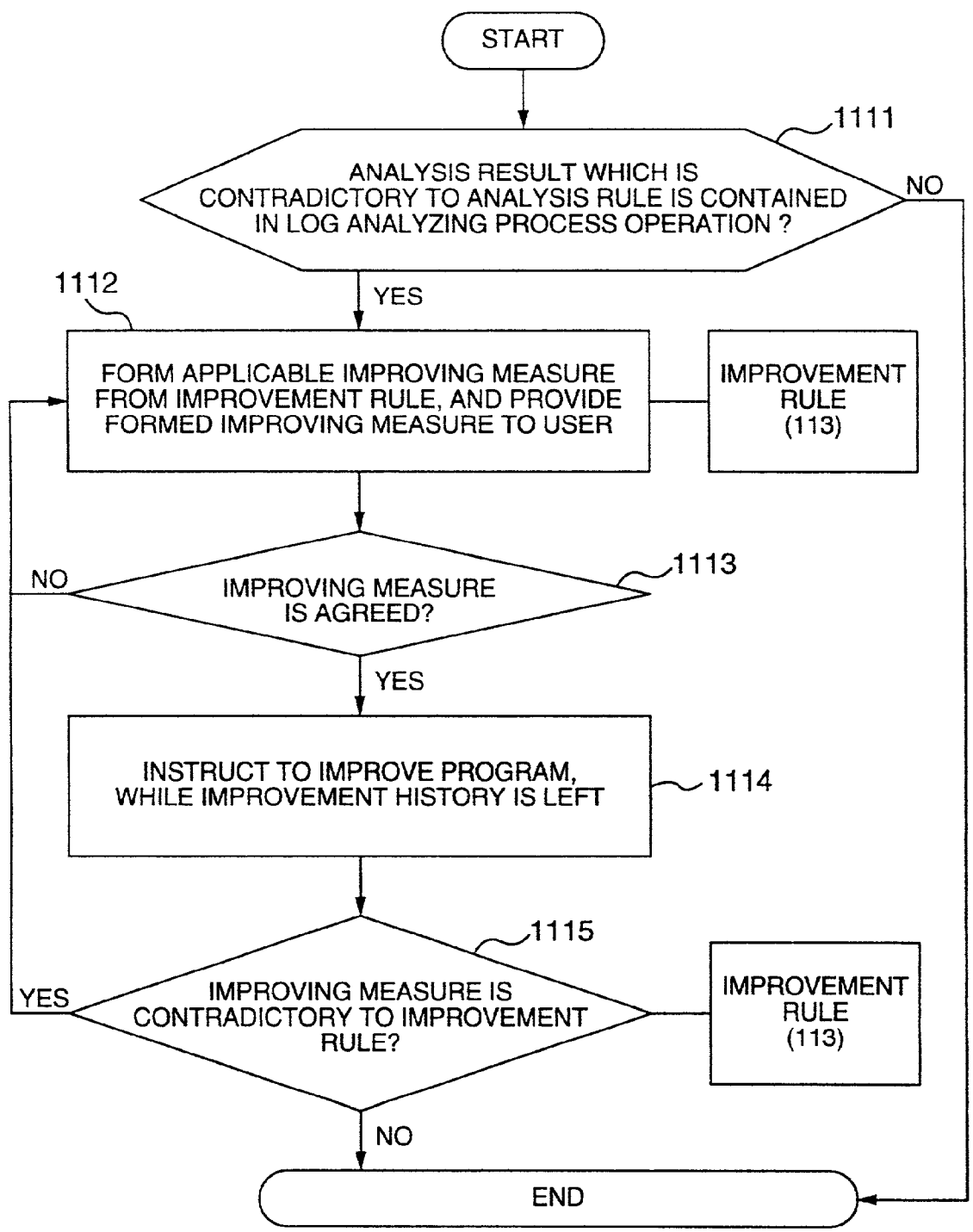

EXAMPLE OF IMPROVEMENT RULE (113)

FIG. 13

EXAMPLE OF IMPROVING MEASURE PROVISION BY PROGRAM IMPROVEMENT SUPPORTING PROCESS OPERATION (110)

APPLICATION EXECUTION RESULT:
DOCUMENT PROCESS APPLICATION IS ENDED UNDER ABNORMAL STATUS. THIS IS BECAUSE EVENT "ABNORMAL END" HAPPENS TO OCCUR IN AN XX-TH COLUMN OF PROCESS OPERATION C (OPERATION IN PROCESS OPERATION C IS TO ACQUIRE DATA, AND COMMAND IS "get object") — 1001

CAUSE:
CONNECTION TO DOCUMENT DATABASE IS DISCONNECTED IN PROCESS OPERATION A BEFORE DATA ACQUIRING OPERATION OF PROCESS OPERATION C — 1002

IMPROVING MEASURE 1:
CONNECT PROCESS OPERATION TO DOCUMENT DATABASE IS INSERTED BEFORE DATA ACQUISITION OPERATION OF PROCESS OPERATION C    YES   NO — 1301

IMPROVING MEASURE 2:
CONNECT/DISCONNECT PROCESS OPERATION OF PROCESS OPERATION C WITH RESPECT TO DOCUMENT DATABASE IS DELETED?    YES   NO — 1302

LOG ANALYZING METHOD, EXECUTION APPARATUS FOR THE SAME, AND RECORDING MEDIUM FOR RECORDING PROCESS PROGRAM THEREOF

BACKGROUND OF THE INVENTION

1. Field of the Invention

The present invention is related to a log analyzing apparatus for analyzing log information which is outputted by an application system in a computer. More specifically, the present invention is directed to such a technique effectively applied to such a log analyzing apparatus capable of improving an application program based upon an analysis result of log information.

2. Description of the Related Art

Conventionally, in the case that errors happen to occur while programs are executed by way of computers, error messages which are outputted from systems when the errors happen to occur are analyzed, and/or log information outputted while programs are executed are analyzed so as to investigate the reasons why these errors occur. Thereafter, the programs are improved, if necessary.

For instance, in a database process system, an on-line system such as a system of a financial institute, and an operation management system of a railroad, while journal (system history) information is acquired as the above-explained log information during the system operations, this journal information is used to be investigated in order that these systems are recovered when the failures occur.

It should be understood that the below-mentioned journal acquiring/analyzing apparatus is described in JP-A-2000-122901. That is, since the journal points are defined and used with respect to the program, this journal acquiring/analyzing apparatus can easily set the journal information, and can readily compare/investigate the acquired journal information with the design data.

In the above-explained prior art, the log information outputted when the program is executed is analyzed so as to check the occurring reason of the error. As a result, in such a case that the user does not know the internal structure of the program, the prior art system owns such a problem that the log information cannot be analyzed, but also the program cannot be improved.

For instance, in such a case that while a user conducts such a process system as a database process system and produces a process program specific to this user by employing a simplified language such as script, this user operates the user specific process program and an error happens to occur, since the user does not own specialized techniques similar to these owned by system developing engineers, this user cannot perform the log analyzing operation. Even when a relatively simple mistake may constitute the occurring reason of the above-explained error, there is such a problem that lengthy time is necessarily required to investigate the reason why such an error happens to occur, and also lengthy time is necessarily needed so as to improve the process program.

SUMMARY OF THE INVENTION

The present invention has been made to solve the above-described problems, and therefore, has an object to provide such a technique capable of analyzing logs even in such a case that a user does not know an internal structure of a program. The present invention is featured by such a log analyzing apparatus for analyzing logs outputted when a program is executed by a computer, a reason why an error happens to occur while the program is executed by the computer by judging as to whether or not each of operations when such a program is executed, which are extracted from log information can satisfy an initial condition thereof.

In the log analyzing apparatus of the present invention, firstly, the log analyzing apparatus accepts as input information such a detailed log information which is outputted with respect to a certain range of a program, and then reads this accepted log information so as to acquire an operation sequence of a predetermined application and also log level definition information. Then, the log analyzing apparatus forms a log table in which contents of the log information are edited with respect to each of operation sequences of the application.

After a log designation condition indicative of log information to be extracted has been accepted from the user, the log analyzing apparatus extracts information from the log table based upon this user designation condition, and judges as to whether or not an initial condition thereof with respect to each of the operations when the program is executed can be satisfied by employing a predetermined analysis rule. As a result, the log analyzing apparatus analyzes a cause of an error which happens to occur during the program execution, and then, provides this analysis result to the user.

Also, the log analyzing apparatus compares the above-explained analysis result of the log information with an improvement rule indicative of a program improving method while the error happens to occur, and thus, provides such an improvement rule capable of improving the error, which is provided based upon the analysis result of the log information.

As previously described, in accordance with the present invention, since the log information is analyzed by employing the predetermined analysis rule, even when the user does not know the internal structure of the program which should be analyzed, the log analysis can be carried out. Also, the log analyzing apparatus can clarify the cause of the error based upon the analysis result, and further, can improve this program.

As previously explained in detail, in accordance with the log analyzing apparatus of the present invention, the cause of the error occurred while the program is executed is analyzed by judging as to whether or not each of the operations when the program is executed which are extracted from the log information can satisfy the initial condition thereof. As a consequence, even when the user does not know the structure of the program, the log analysis can be carried out.

BRIEF DESCRIPTION OF THE DRAWINGS

A more better understanding of the present invention may be made by reading a detailed description in conjunction with the accompanying drawings, in which:

FIG. 2 is a diagram for indicating one example of log information 103 which constitutes input data of the log analyzing apparatus according to this embodiment mode;

FIG. 3 is a flow chart for describing a process sequence of a log acquiring/reading process operation executed by the log analyzing apparatus of this embodiment mode;

FIG. 4 is a diagram for indicating one example of an AP operation sequence and a log level definition 111 of the log analyzing apparatus according to this embodiment mode;

FIG. 5 is a diagram for indicating one example of a log table employed in the log analyzing apparatus according to this embodiment mode;

FIG. 6 is a diagram for representing one example of a user designation executed in a user designation command accepting process operation of the log analyzing apparatus according to this embodiment mode;

FIG. 8 is a diagram for indicating one example of an extracted result of log information obtained by a log analyzing process unit 108 of the log analyzing apparatus according to this embodiment mode;

FIG. 9 is a diagram for representing one example of an analysis rule 112 of the log analyzing apparatus according to this embodiment mode;

FIG. 10 is a diagram for indicating a provision example of an analysis result obtained by a log analysis result providing process operation of the log analyzing apparatus according to this embodiment mode;

FIG. 11 is a flow chart for describing a process sequence of a program improvement supporting process operation executed in the log analyzing apparatus of this embodiment mode;

FIG. 13 is a diagram for representing a provision example of an improving measure executed in the program improvement supporting process operation of the log analyzing apparatus according to this embodiment mode.

DESCRIPTION OF THE EMBODIMENTS

A description will now be made of a log analyzing apparatus, according to an embodiment mode of the present invention, which analyzes a log outputted when a program is executed by a computer.

Figure 1:
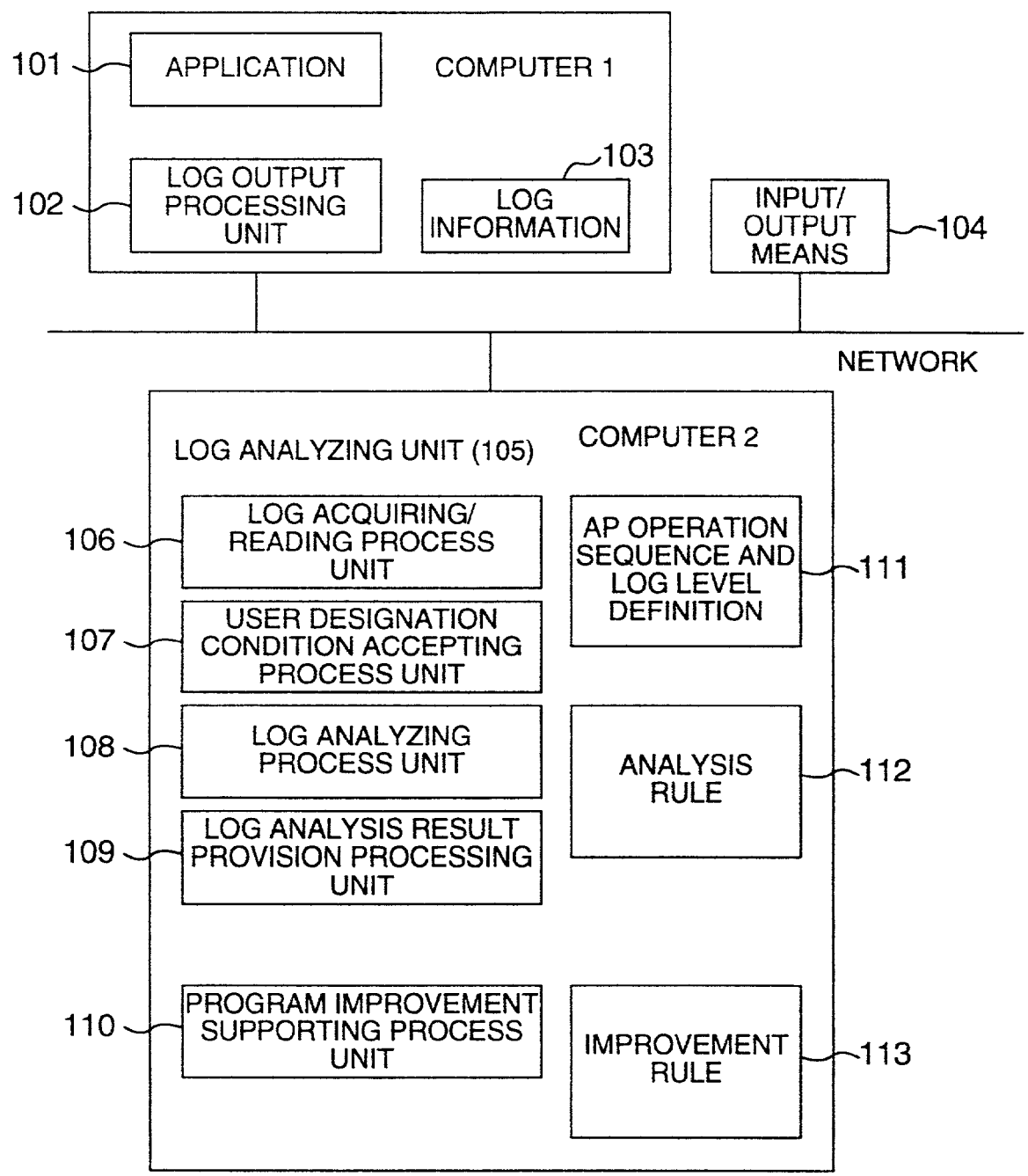
FIG. 1 is a diagram for schematically representing a system arrangement of a log analyzing apparatus according to an embodiment mode of the present invention.

FIG. 1 is a schematic diagram for indicating a system arrangement of the log analyzing apparatus according to this embodiment mode. As indicated in FIG. 1, a computer 2 of this embodiment mode containes a log analyzing unit 105, a log acquiring/reading process unit 106, a user designation condition accepting process unit 107, a log analyzing process unit 108, a log analysis result provision processing unit 109, and a program improvement supporting process unit 110.

The log analyzing unit 105 corresponds to a process unit for controlling an entire analyzing process operation for logs. The log acquiring/reading process unit 106 corresponds to such a process unit for acquiring log information 103 to read the acquired log information 103 which is outputted when a program is executed. The user designation condition accepting process unit 107 corresponds to such a process unit for accepting a user designation condition indicative of log information to be extracted.

The log analyzing process unit 108 corresponds to a process unit which extracts information from such a log table indicative of the content of the log information 103 based upon the accepted user designation condition. Also, this process operation judges as to whether or not each of operations while a program is executed can satisfy an initial condition thereof in order to analyze a cause of an error occurred when the program is executed.

The log analysis result provision processing unit 109 corresponds to such a process unit for providing the above-described analysis result to a user. The program improvement supporting unit 110 corresponds to such a process unit which compares the analysis result of the log information 103 with an improving rule representative of an improving method for a program when an error occurs, and provides an improving rule used to improve the error, which is provided based upon the analysis result of the log information 103.

It is so assumed that such a program is recorded on a magnetic medium such as a CD-ROM and then this recording medium is stored into a magnetic disk drive and the like, and thereafter, this program is loaded onto a memory so as to be executed. This program may cause the computer 2 to function as the log analyzing unit 105, the log acquiring/reading process unit 106, the user designation condition accepting process unit 107, the log analyzing process unit 108, the log analysis result provision processing unit 109, and also the program improvement supporting process unit 110. It should be noted that the above-described recording medium used to record thereon the program may be realized by any recording media other than a CD-ROM.

In this embodiment mode, the application 101 outputs the detailed log information 103 by the log output processing unit 102. While this log information 103 is employed as input data, the log analyzing unit 105 for performing the log analyzing process is constituted by the log analyzing/reading process unit 106, the user designation condition accepting process unit 107, the log analyzing process unit 108, the log analysis result provision processing unit 109, and also the program improvement supporting process unit 110. Also, while the log analyzing unit 105 executes the log analyzing process, this log analyzing unit 105 refers to an application (will be abbreviated as an "AP" hereinafter) operation sequence, a log level definition 111, an analysis rule 112, and an improvement rule 113, whereas the log analysis result provision processing unit 109 provides an analysis result to a user via the input/output means 104. It should also be noted that the computer 1 and the computer 2 may be constituted by the same computer machines.

FIG. 2 is a diagram for representing an example of the log information 103 which constitutes input data of the log analyzing apparatus according to this embodiment mode. In this example, while a first column up to a fifth column show initial setting information, initial information such as a usable log level and a log output formation, which is determined by the log output processing unit 102, is outputted. A sixth column up to a 12-th column correspond to log information related to a processing unit "A" of an application. A 14-th column up to an 18-th column correspond to log information related to a processing unit "C" of the application. Also, a 20-th column corresponds to such log information when the application is completed.

FIG. 3 is a flow chart for indicating a process sequence of a log acquiring/reading process operation executed in the log analyzing apparatus according to this embodiment mode. As indicated in FIG. 3, at a step 311, the log acquiring/reading process unit 106 accepts a positional designation input of log information, and acquires the log information 103 as input data. As the positional designation of the log information 103, there is such a method for designating both a directory and a file name within the same computer machine. Also, as the positional designation of the log information 103, in the case that the log information 103 is located on a computer machine connected to the Internet, a file may be designated based upon an instruction capable of identifying this file, for example, URL (UNIFORM RESOURCE LOCATORS) may be designated (HTTP://WWW.HITACHI.CO.JP/SERVER/MACHINE01/LOGDATA/FILE 1).

At a step 312, both an application operation sequence (will be referred to as an "AP operation sequence" hereinafter) and the log level definition 111 are read in the memory. At a step 313, such a log table 501 shown in FIG. 5 is formed by establishing a correspondence relationship between the AP operation sequence and the log level definition 111, which have been read in the memory. Then, this log table 501 is outputted to either the memory or the buffer.

FIG. 4 is a diagram for showing one example of the AP operation sequence and of the log level definition 111 in the log analyzing apparatus according to this embodiment mode. This example represents such a case that the application software corresponds to document process software.

A log level correspondence example 401 shows a correspondence portion between the log level definition 411 and an operation sequence 412 of the document process application. In this example, for instance, an access process operation to a document database is defined as a "level 1." This level corresponds to, namely LOG LEVEL=1 appeared in the log information 103.

An AP operation sequence correspondence example 402 indicates such a correspondence portion between the operation sequence 412 of the document process application and the operation command 413. For example, as to the access process operation to the document database, such a correspondence relationship indicates that a connection process operation corresponds to a command "CONNECT", i.e., a plurality of actual commands correspond to classifications of these actual commands. While both the AP operation sequence and the log level definition 111 are employed which have been defined in this manner, the log table 501 is formed from the log information 103 in the process operation defined at the step 313.

FIG. 5 is a diagram for indicating one example of the log table employed in the log analyzing apparatus of this embodiment mode. When correspondence relationships are established with respect to the contents of the log information 103 by using both the AP operation sequence and the log level definition 111, the log table of FIG. 5 may be made. For example, a first column up to a fifth column of the log information 103 correspond to application initial setting information; a sixth column up to a seventh column correspond to initial setting information of a process operation "A"; an eighth column corresponds to an access process operation (connect) to the document database; a ninth column corresponds to newly forming of document data; and the like. As explained above, since the log table 501 is formed from the log information 103 to be displayed, even such a user who does not know a structure of a program can readily understand the content of this log information 103.

FIG. 6 is a diagram for showing one example of the user designation executed in the user designation condition accepting process operation of the log analyzing apparatus according to this embodiment mode. A user designation example 601 shows such an example that log information extracted from the log table 501 is designated. For instance, FIG. 6 represents such an example case that the user designation example 601 is displayed on a screen, and a user marks log information to be extracted.

With respect to such log information to be extracted, the user may select to designate this log information based upon the operation sequence of the document process application.

In this example, the user instructs to extract the log information with respect to an access process operation to a document database; an update process operation of a document database; newly forming of document data; an access process operation to document data; and also a deletion of document data; whereas the user instructs not to extract the log information with respect to an exclusive process operation of data; and an exclusive process operation of a database. As a result, such data which is not extracted is neglected in the log analyzing process operation.

Figure 7:
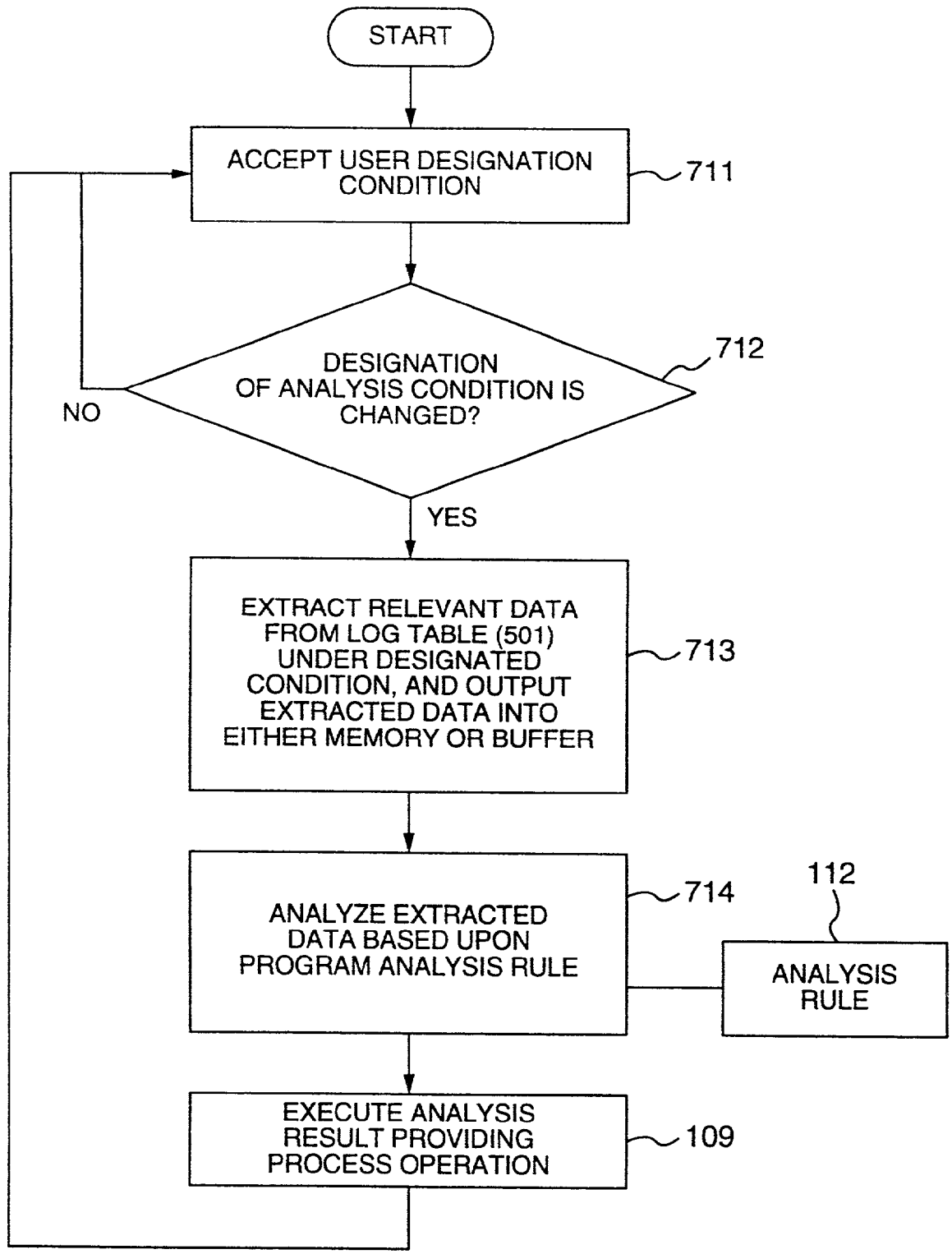
FIG. 7 is a flow chart for describing a process sequence of a log analyzing process operation executed in the log analyzing apparatus of this embodiment mode.

FIG. 7 is a flow chart for indicating a process sequence of a log analyzing process operation executed by the log analyzing apparatus according to this embodiment mode.

As indicated in FIG. 7, at a step 711, the user designation condition accepting process unit 107 accepts as an analysis condition designating input value, such a value which is entered by a user as a user designation condition indicative of the log information extracted in the above-described manner.

At a step 712, the log analyzing process unit 108 judges as to whether or not the above-described analysis condition designating input value is changed from the previously-inputted analysis condition input value. When the analysis condition designating input value is changed from the previous-inputted analysis condition input value, the log analyzing process operation is advanced to a step 713. At this step 713, the log analyzing process unit 108 extracts relevant data from the log table 501 under this designated condition and then, outputs the extracted data to either the memory or the buffer.

FIG. 8 is a diagram for indicating one example of extracted results of the log information by the log analyzing process unit 108 of the log analyzing apparatus according to this embodiment mode. An extraction result example 801 indicates data extracted by the user designation example 601 shown in FIG. 6. In this case, an access process operation (connect) to a document database, newly forming of document data and an access process to a document database are extracted result in the process operation "A". And an access process operation (acquire) to a document database, error are extracted result in the process operation "C". It should also be noted that even when no designation is issued from the user in this example, the error information is extracted.

At the next step 714, the log analyzing process unit 108 analyzes the above-explained extracted data based upon a program analysis rule 112, and provides the analysis result by the log analysis result provision processing unit 109. Thereafter, the log analyzing process operation is returned to the previous step 711 at which the user designation condition accepting process unit 107 accepts a next designation.

FIG. 9 is a diagram for indicating one example of the program analysis rule 112 employed in the log analyzing apparatus according to this embodiment mode. As illustrated in FIG. 9, the program analysis rule 112 represents an initial condition as to each of operations when the program is executed. For instance, as to a rule 1, in the case that an AP operation corresponds to an access process operation to document data, an initial condition of this access process operation determines that the log analyzing apparatus is previously connected to the document database.

When the log analyzing process unit 108 detects an error indicating an "abnormal end" by referring to the extracted result of the log information of a step 714, this log analyzing process unit 108 reads the initial condition of the previous operation from the program analysis rule 112, and judges as to whether or not this read initial condition can be satisfied so as to execute the log analysis. For example, when the log analyzing process unit 108 detects "error: abnormal end by unauthorized process operation" in the extracted result example 801 of FIG. 8, this log analyzing process unit 108 reads out from the program analysis rule 112, such an initial operation "being previously connected to document database" of the previous operation thereof "access process operation to document data", and thereafter, checks as to whether or not the log analyzing apparatus is connected to the document database. In other words, the log analyzing process unit 108 retrieves "access process operation to document database" from the extracted result example 801 of FIG. 8, and confirms as to whether or not the log analyzing apparatus is connected to the document database. In this case, since "access process operation (disconnect) to document database" is present subsequent to "access process operation (connect) to document database" within the extracted result example 801 of FIG. 8, and thereafter, "access process operation (acquire) to document data" is carried out, the log analyzing process unit 108 judges that cutting of the document data may cause the abnormal end.

FIG. 10 is a diagram for showing a provision example of the analysis results obtained by the log analysis result provision processing operation of the log analyzing apparatus according to this embodiment mode. In a provision example 1001 of FIG. 10, execution results of an application are provided. This provision example 1001 of FIG. 10 represents that since an event "abnormal end" happens to occur in the process operation "C", a document process application is ended under abnormal status.

In another provision example 1002, an analysis result obtained based upon the analysis rule 112 is provided as to the reason why the event "abnormal end" happens to occur. While the document data acquisition executed in the process operation "C" corresponds to the access operation to the document data, this provision example 1002 indicates that the connection to the document database corresponding to the initial condition used to execute this process operation is cut in the process operation "A" preceding to this process operation, and thereafter, no connection is made to the document database.

FIG. 11 is a flow chart for describing a process operation of a program improvement supporting process operation executed in the log analyzing apparatus according to this embodiment mode. At a step 1111 of FIG. 11, the program improvement supporting process unit 110 judges as to whether or not there is such an analysis result which is contradictory to the analysis rule 112 in the log analyzing process unit 108. When there is no analysis result which is contradictory to the analysis rule 112, this process operation is ended. To the contrary, when there is such an analysis result which is contradictory to the analysis rule 112, the program improvement supporting process unit 110 forms an applicable improvement measure with reference to an improvement rule 113 at a step 1112, and then provides the applicable improvement measure to the user.

At a step 1113, the program improvement supporting unit 110 confirms as to whether or not this improving measure can be agreed with the user. When this improving measure cannot be agreed with the user, the process operation is returned to the previous step 1112 at which the program improvement supporting process unit 110 newly forms an improving measure. At the step 1113 to the contrary, when the improving measure can be agreed with the user, the program improvement supporting process unit 110 outputs an improvement history and records the improvement history at a step 1114, and thereafter, issues an instruction of improving the program.

At a steps 1115, the program improvement supporting process unit 110 checks as to whether or not such an improvement result obtained in the case that the relevant program is corrected in accordance with the above-explained provided improving measure is newly contradictory to the improvement rule 113. If this improvement result is contradictory to the improvement rule 113, for instance, a shortage, or excess of contents of relative operation, then the process operation is returned to the previous step 1112. At this step 1112, the program improvement supporting process unit 110 provides an improvement measure. To the contrary, when the improving result is not contradictory to the improvement rule 113, the process operation is ended.

Figure 12:
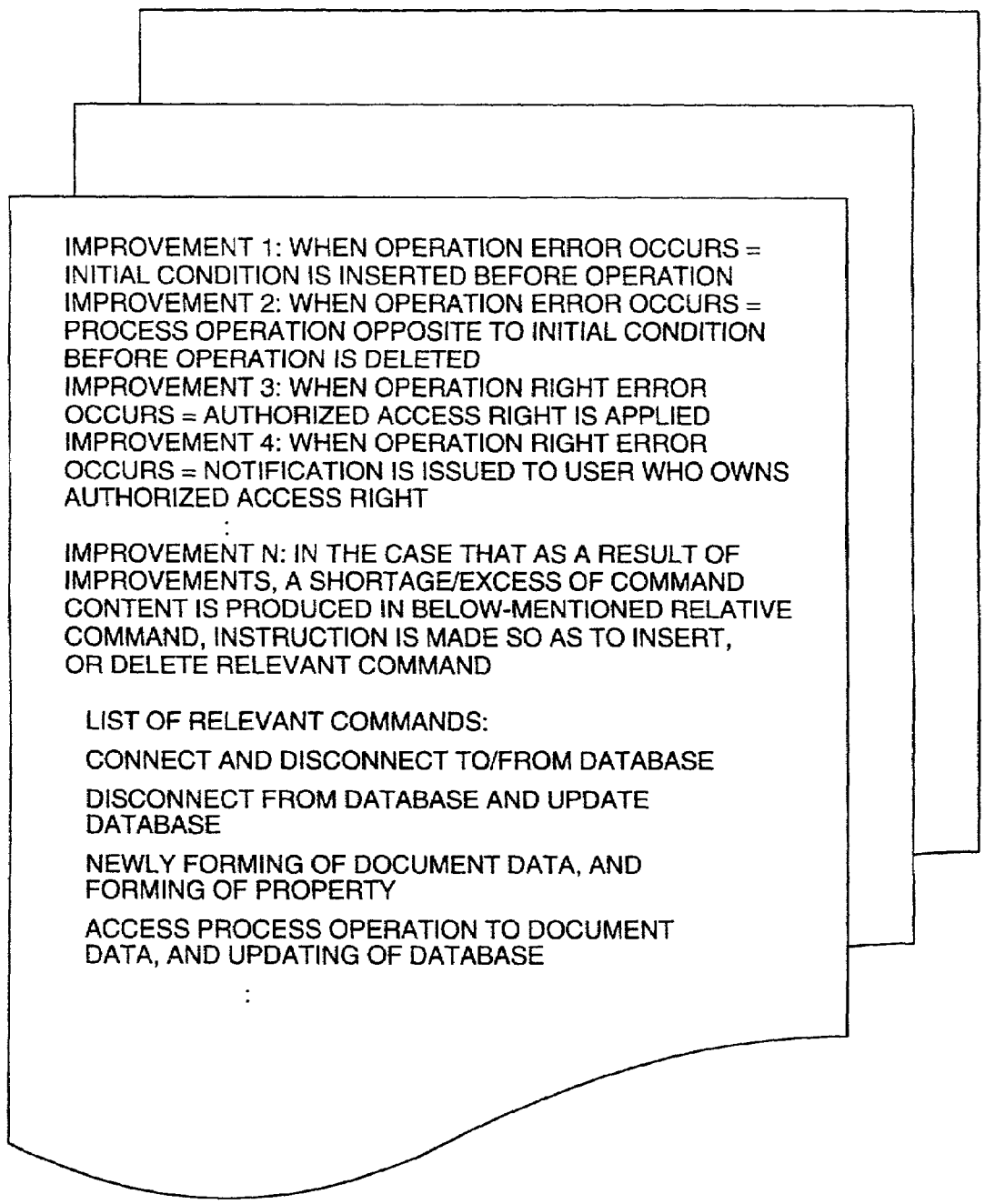
FIG. 12 is a diagram for showing one example of an improvement rule executed in the log analyzing apparatus according to this embodiment mode.

FIG. 12 is a diagram for showing one example of the improvement rule employed in the log analyzing apparatus according to the embodiment mode. For instance, in such a case that an error is detected from a portion of "operation" of an analysis rule, either "initial condition is inserted before operation" of the improvement rule 1 or "operation opposite to initial condition is deleted before operation" of the improvement rule 2 is provided as an improving measure.

FIG. 13 is a diagram for representing a provision example of the improving measure obtained by the program improvement supporting process operation of the log analyzing apparatus according to this embodiment mode. Both a provision example 1001 and another provision example 1002 of FIG. 13 correspond to the previously explained analysis results.

In a cause analysis of the provision example 1002, it is cleared that the connection to the document database in the process operation "A" is cut before the data acquisition operation of the process operation "C." As a result, in an improving measure 1 (namely, provision example 1301) with employment of the improvement rule 1, the user is inquired as to whether or not the connection process operation to the document database is inserted before the data acquisition operation of the process operation "C". Also, in another improving measure 2 (namely, provision example 1302) with employment of the improvement rule 2, the user is inquired as to whether or not the connect/cut process operation with respect to the document database of the process operation "A" is deleted.

Figure 14:
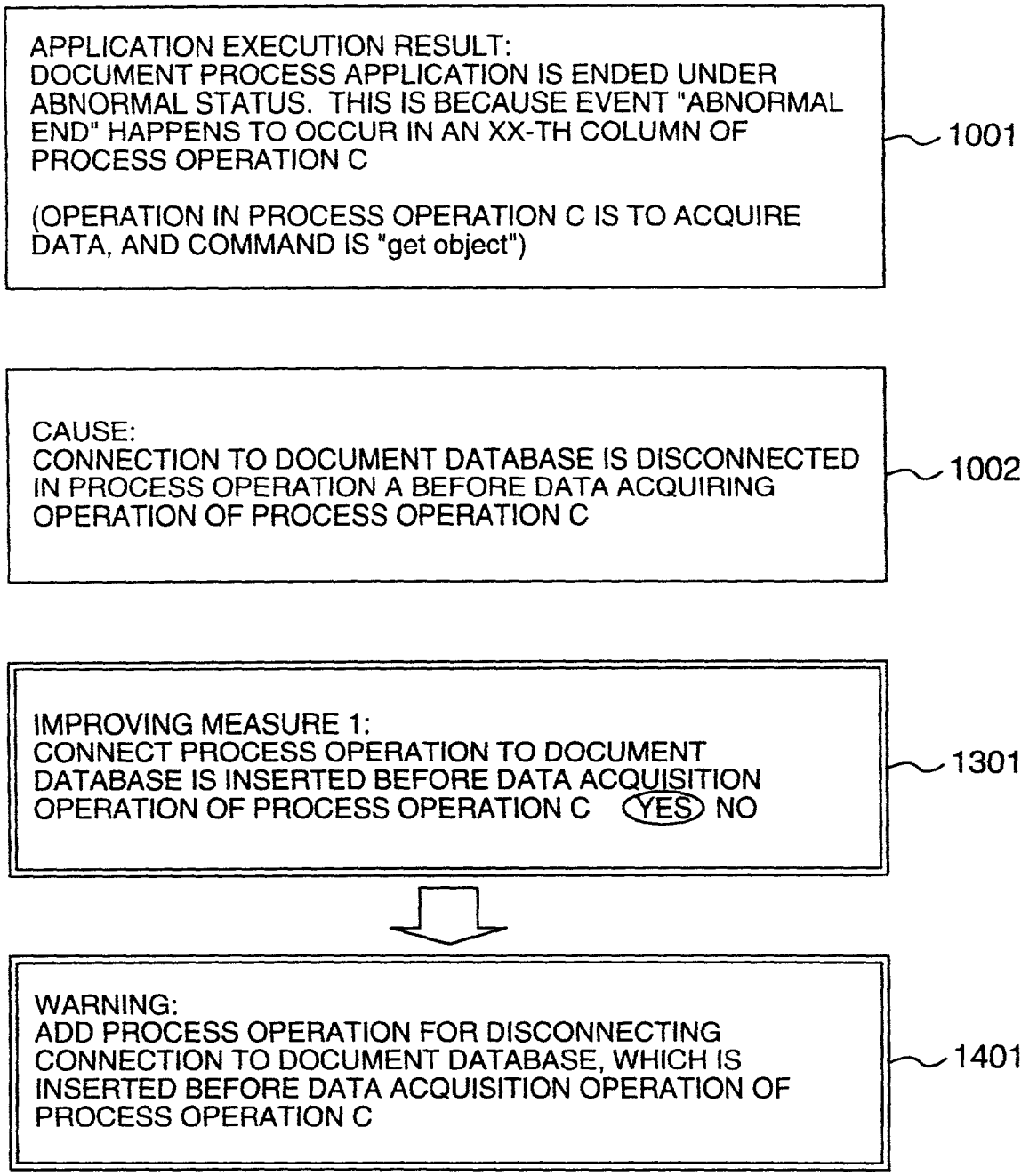
FIG. 14 is a diagram for indicating a continued portion of a provision example in such a case that a solving measure 1 is selected in the provision of improvement supporting process operation of the log analyzing apparatus according to this embodiment mode.

FIG. 14 is a diagram for indicating a continuation of the provision example in the case that the solving measure 1 is selected in the provision of the improving measure obtained by the program improvement supporting process operation of the log analyzing apparatus according to this embodiment mode. Since "YES" is selected in the improving measure 1 of the provision example 1301, when the connection process operation to the document database is inserted, a shortage/excess of relative commends of an improvement rule "N" occurs. A warning notice is made as follows: A process operation is added also to the database cut which is related to the database connect (provision example 1401). It should be noted that this embodiment mode has described only "database connect and database cut" as a related rule "N", another warning notices may be issued in such a case that a shortage/excess of other relative commands will occur.

As previously described in detail, in accordance with the log analyzing apparatus of this embodiment mode, the cause of the error occurred while the program is executed is analyzed by judging as to whether or not each of the operations when the program is executed which are extracted from the log information can satisfy the initial condition. As a result, even when the user does not know the structure of the program, the log analysis can be carried out.

Also, in accordance with the present invention, the cause of the error occurred while the program is executed is analyzed by judging as to whether or not each of the operations when the program is executed which are extracted from the log information can satisfy the initial condition. As a consequence, even when the user does not know the structure of the program, the log analysis can be carried out.

What is claimed is:

1. A log analyzing method for analyzing log information output when a program is executed by a computer, comprising:

a step for acquiring log information output if a program is executed to thereby read the acquired log information;

a step for accepting a user designation condition indicative of a category and a level of log information which is extracted, the user designation condition including an application operation sequence for designating a category and a log level definition for designating the level of log information;

a step for extracting information from the log information based upon said accepted user designation condition, and for judging as to whether or not each of operations while the program is executed can satisfy an initial condition thereof so as to analyze a cause of an error occurred while the program is executed;

a step for providing a result of error cause analysis to a user;

a step for providing an improvement rule used to improve said error, wherein the improvement rule is provided based on an analysis result of the log information; and a step for comparing the analysis result of the log information with the improvement rule for an improving method for the program if the error occurs.

2. A log analyzing method as claimed in claim 1, further comprising:

a step for comparing the analysis result of the log information with an improvement rule which indicates an improving method of the program when the error happens to occur, and for providing such an improvement rule used to improve the error, which is provided based on the analysis result of said log information.

3. A log analyzing method as claimed in claim 1, further comprising:

a step in which when said program is corrected in accordance with said provided improving measure and thus, a shortage/excess is produced in a content of the related operation, a warning notice capable of solving said shortened/excessive operation content is provided.

4. A log analyzing apparatus for analyzing log information outputted when a program is executed by a computer, comprising:

a log acquiring/reading process unit configured to acquire log information outputted when a program is executed to thereby read the acquired log information;

a user designation condition accepting process unit configured to accept a user designation condition indicative of a category and a level of log information which is extracted, the user designation condition including an application operation sequence for designating a category and a log level definition for designating the level of log information;

a log analyzing process unit configured to extract information from the log information based upon said accepted user designation condition, and for judging as to whether or not each of operations while the program is executed can satisfy an initial condition thereof so as to analyze a cause of an error occurred while the program is executed;

a log analysis result providing process unit configured to provide an analysis result to a user; and a rule improving process unit configured to provide an improvement rule used to improve said error, wherein the improvement rule is provided based on an analysis result of the log information, and configured to compare the analysis result of the log information with the improvement rule for an improving method for the program if the error occurs.

5. In a computer readable recording medium for recording thereon a program by which a computer functions as a log analyzing apparatus capable of analyzing log information outputted when the program is executed by the computer, said computer readable recording medium is comprised of:

a log acquiring/reading process step for acquiring log information outputted when a program is executed to thereby read the acquired log information;

a user designation condition accepting process step for accepting a user designation condition indicative of a category and a level of log information which is extracted, the user designation condition including an application operation sequence for designating a category and a log level definition for designating the level of log information;

a log analyzing process step for extracting information from the log information based upon said accepted user designation condition, and for judging as to whether or not each of operations while the program is executed can satisfy an initial condition thereof so as to analyze a cause of an error occurred while the program is executed; and a log analysis result providing process step for providing an analysis result to a user; and a rule improving process step for providing an improvement rule used to improve said error, wherein the improvement rule is provided based on an analysis result of the log information, and for comparing the analysis result of the log information with the improvement rule for an improving method for the program if the error occurs.

* * * * *